United States Patent [19]

von der Brake

[11] Patent Number: 4,789,246
[45] Date of Patent: Dec. 6, 1988

[54] RADIATION DETECTOR OR THE LIKE

[75] Inventor: Dieter von der Brake, Altena, Fed. Rep. of Germany

[73] Assignee: Alcatel N.V., Amsterdam, Netherlands

[21] Appl. No.: 319,262

[22] Filed: Nov. 9, 1981

[30] Foreign Application Priority Data

Nov. 14, 1980 [DE] Fed. Rep. of Germany ....... 3042992

[51] Int. Cl.$^4$ ............................................. G01K 1/00
[52] U.S. Cl. ...................................................... 374/208
[58] Field of Search ................. 250/234, 239; 374/208, 374/137; 33/137 R, 138, 161; 73/432 A, 432 B; 242/166, 56.1

[56] References Cited

U.S. PATENT DOCUMENTS

| 2,971,041 | 2/1961 | FRX | 374/140 |
| 3,680,214 | 8/1972 | Quenot | 33/161 |
| 3,721,124 | 3/1973 | Franks | 374/137 |
| 3,779,474 | 12/1973 | Harelson | 242/56.1 |
| 4,228,590 | 10/1980 | Kimura | 33/138 |

FOREIGN PATENT DOCUMENTS

| 2261531 | 6/1973 | Fed. Rep. of Germany | 374/137 |
| 9214 | of 1842 | United Kingdom | 33/138 |

Primary Examiner—William A. Cuchlinski, Jr.
Assistant Examiner—W. Morris Worth
Attorney, Agent, or Firm—Christie, Parker & Hale

[57] ABSTRACT

The measuring probe at the top end of a telescopic tube of a radiation counter for measuring an ionizing radiation is connected to the measuring circuit via a thin ribbon cable capable of being wound onto a take-up drum of a metering instrument. A thin steel tape is attached to the ribbon cable and extends in parallel therewith. When a mutual twisting of the individual sections of the telescopic tube occurs while the same is being extracted, the ribbon cable is prevented from being twisted as well, because the measuring probe is axially rotatable and runs in ball bearings, and because the thin attached steel tape has the necessary torsional rigidity. Together with the steel tape, the ribbon cable can be wound onto the take-up drum even at very low temperatures (such as −30° C.) without any noteworthy additional winding force being required to this end.

5 Claims, 1 Drawing Sheet ial view is shown in FIG. 2.

RADIATION DETECTOR OR THE LIKE

BACKGROUND OF THE INVENTION

The invention relates to metering instruments and, more particularly, to a radiation detector or the like.

PRIOR ART STATEMENT

Metering instruments that measure the quantities and actions (effects) of a radiation or flow field acting thereupon from the outside most often contain a measuring probe which is either arranged on the outside of the metering instrument or is capable of being attached thereto. The measuring probe acts as a transducer and to form a reproducible electric signal from the action quantity of the field to be measured. Such fields may be temperature radiation fields, or the field of an ionizing nuclear radiation, of an outflowing gas, or else fields of other media or states. If the person operating the instrument and performing the measurement is not supposed to come into contact with the test point, or is not supposed to be exposed to the action (effects) of the quantity to be measured, it is known for the measuring probe to be positioned more or less far away from the actual metering instrument forming and indicating (displaying) the measured value with the aid of an extractable telescopic tube assembly.

Such a known type of metering instrument, for example, is the "Dosimeter X 1000" manufactured by the firm of Graetz Raytronik GmbH, Altena/Germany which is provided with an extractable telescopic tube assembly attached to the housing of the metering instrument and capable of being extracted up to three meters. At the top end of the telescopic tube assembly there is arranged a probe housing inside which there is rotatably suspended the probe holder for taking up the measuring probe in order thus to prevent the connecting cable extending inside the telescopic tube assembly to the housing of the metering instrument from breaking. In a conventional type of metering instrument the cable within the telescopic chamber of the housing of the metering instrument is wound onto an automatically operating take-up drum (reel) so that the connecting cable is always acted upon by the tension of a spring.

When such a prior art metering instrument is used at very low temperatures, for example, at subzero temperatures down to $-30°$ C., the sheathing of the generally used round cable serving as the connecting cable becomes inflexible. It is so inflexible that the winding up of this cable at these low temperatures requires high winding forces. These effect the automatic winding of the cable onto the take-up drum. The force required for extracting the telescopic shaft becomes unreasonably high or causes a hazard to exist. This is true because of the opposing winding force and the frictional or engaging forces required for retaining the extracted telescopic tube. For example, at least at normal ambient temperatures, the high winding force of the take-up drum will cause the telescopic tube assembly to be retracted in an uncontrolled manner.

SUMMARY OF THE INVENTION

In accordance with the detector of the present invention, the above-described and other disadvantages of the prior art are overcome by providing a metering instrument that has a telescopic tube assembly that is capable of being easily extracted at very low temperatures without producing an uncontrolled retraction of the telescopic tube.

BRIEF DESCRIPTION OF THE DRAWINGS

In the accompanying drawings which illustrate exemplary embodiments of the present invention.

DESCRIPTION OF THE PREFERRED EMBODIMENT

The invention in particular offers the advantage that a thin ribbon cable also at very low temperatures is much more flexible than a round sheathed cable and, therefore, can be wound onto the take-up drum much more easily, i.e., by requiring much less winding force when wound at low temperatures. The thin ribbon cable, of course, tends to become twisted much more easily than a round cable and also has a smaller restoring force especially when subjected to higher ambient temperatures. This drawback is compensated for by the steel tape extending parallel in relation to the thin ribbon cable and providing the restoring force which is lacking with the thin ribbon cable.

A thin steel tape can provide a particularly good restoring force by simultaneously requiring small winding forces.

There can also be provided a ribbon cable which still remains very flexible also at very low temperatures.

Figure 1:
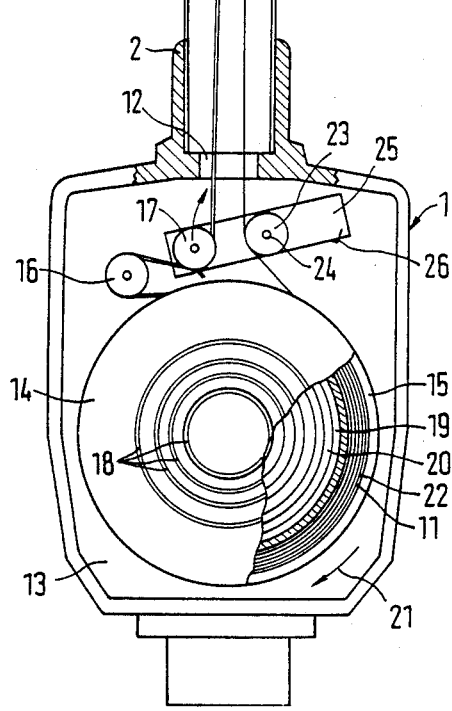
FIG. 1 is a vertical elevational view, partly in section, of a metering instrument constructed in accordance with the present invention.

A metering instrument constructed according to the present invention and shown in FIG. 1 comprises an instrument housing 1 which has a tubular attachment 2. A telescopic shaft assembly 4 including two or more sliding tubes slide within each other to provide a shaft of variable length. At the end of the last tube section 5 of the telescopic tube assembly 4 a probe housing 6 is mounted rigidly. Inside the probe housing 6 there is provided a probe holder 7 which, with the aid of ball bearings 8 and 9, is attached in an axially rotatable manner inside the probe housing 6. Probe holder 7 carries an interchangeable measuring probe 10 at its top side. The measuring probe 10 is connected electrically via a thin ribbon cable 11 to the measuring circuit which is arranged inside the housing 1.

Figure 2:
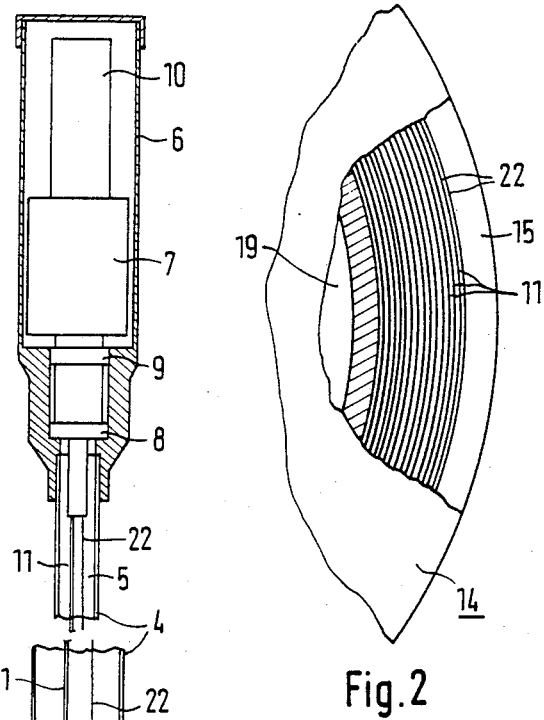
FIG. 2 is a broken-away side elevational view of a take-up drum shown in FIG. 1.

The ribbon cable 11 is attached to the probe holder 7. The cable extends inside the sections of the telescopic tube assembly 4 and is led through an opening 12 in the instrument housing 1 within the tubular housing attachment 2, into a winding chamber 13 of the instrument housing. Inside this winding chamber 13 there is positioned a take-up drum 14 of which a partly broken away sectional view is shown in FIG. 2.

In a winding groove 15 arranged around the circumference of the take-up drum 14, there is wound up the ribbon cable 11 which is led around a return pulley 16 and a tension roller 17. The end of the ribbon cable 11 is attached to the take-up drum 14, and the conductors of the ribbon cable 11 are led to two collector (slip) rings 18 which, via pickup devices (not shown), are connected to a measuring circuit.

The take-up drum 14 contains a spring housing 19 in which there is supported a spiral spring 20 attached relative to both the drum 14 and the housing 1. The spiral spring 20 is so biased as to exert a torsional force upon the take-up drum 14 in a winding direction 21. This subjects the thin ribbon cable 11 as positioned inside the telescopic tube assembly 4 to a tensile force. This tensile force is kept at a low level in order to prevent the telescopic tube assembly 4 from being extended or retracted thereby. Therefore, this force is insufficient in the case of a twisting of the tube sections of the telescopic tube assembly 4, for reliably preventing the thin ribbon cable 11 from being twisted. For this purpose, and parallel in relation to the thin ribbon cable 11, there is positioned a thin steel tape 22 which is likewise secured to the probe holder 7 on the one hand, and to one wall of the take-up drum 14 on the other hand.

Thin steel tape 22 is wound in the same winding groove 15 of the take-up drum 14, so that each time one winding of the steel tape 22 will come to lie over one winding of the ribbon cable 11. The steel tape 22 is so torsion proof that it, in the case of a twisting of the tube sections of the telescopic tube assembly 4, will keep the probe holder 7 in its rotational position.

The parallel-extending ribbon cable 11 is thus prevented from extending inside the telescopic tube assembly 4. and from being twisted. On the other hand, vertically in relation to the direction in which the steel tape 22 extends, it has such a small bending resistance (flexural stiffness) that it is capable of being wound onto the drum 14 without requiring any noteworthy additional tensile force on the part of the winding spiral spring 20. A return pulley 23 serves to deflect the steel tape 22 through the opening 12 from the winding chamber into the telescopic tube assembly 4. The tension roller 17 which is mounted on a rocker 25 supported rotatably on a shaft 24 of a return pulley 23, serves to compensate, in opposition to the force of a spring 26 engaging on the rocker 25, the lengths of ribbon cable 11 and steel tape 22.

Ribbon cable 11 and steel tape 22 have different lengths owing to the different winding diameters.

Figure 3:
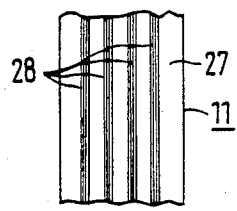
FIG. 3 is a top plan view of a portion of a thin ribbon cable as used in the metering instrument according to FIG. 1, on an enlarged scale.

FIG. 3 shows part of a ribbon cable 11 in a top view. Into a thin base band 27 of, e.g., polystyrene, there are inserted tightly embedded copper conductors 28.

Ribbon cable 11 may include a thin tape of polyester with copper conductors enclosed therein.

What is claimed is:

1. In metering apparatus including a measuring probe mounted inside a head of a telescopic tube assembly, said measuring probe having a mounting arrangement supported axially rotatable inside said head of said telescopic tube, a multi-wire electric cable connected with said measuring probe and extending within said telescopic tube, the combination comprising: a thin ribbon cable; a take-up drum for taking up said cable; a tension spring; and a steel tape parallel to said ribbon cable and positioned to be acted upon by the tension of said tension spring, said steel tape together with said ribbon cable being capable of being wound onto said take-up drum, and being attached to said mounting arrangement of said measuring probe; and a spring-acted tension roller arranged to lead said ribbon cable or said steel tape near the outlet of said take-up drum, towards said telescopic tube.

2. The invention as defined in claim 1, wherein said take-up drum includes a spring housing, a spiral spring in said housing, said spiral spring biasing said take-up drum in the winding-on direction.

3. The invention as defined in claim 1, wherein said steel tape is a thin stainless-steel tape.

4. The invention as defined in claim 1, wherein said steel tape serves as the ground wire of said measuring probe.

5. The invention as defined in claim 1, wherein said ribbon cable includes a thin tape of polyester with copper conductors enclosed therein.

* * * * *